June 3, 1969

R. H. A. SCHOONOVER 3,447,620

DOUBLE WALKING BEAM SUSPENSION AND DRIVE ASSEMBLY
FOR TRACK LAYING VEHICLES

Filed Aug. 15, 1967

Richard H. A. Schoonover
INVENTOR

BY

Agent

United States Patent Office 3,447,620
Patented June 3, 1969

3,447,620
DOUBLE WALKING BEAM SUSPENSION AND DRIVE ASSEMBLY FOR TRACK LAYING VEHICLES
Richard H. A. Schoonover, Albany, Oreg., assignor to Katrak Vehicle Company, Albany, Oreg., a corporation of Oregon
Filed Aug. 15, 1967, Ser. No. 660,828
Int. Cl. B62d 55/12
U.S. Cl. 180—9.52                8 Claims

ABSTRACT OF THE DISCLOSURE

A forward walking beam is connected pivotally intermediate its ends to a vehicle frame and supports a front track-mounting wheel at its front end and is connected pivotally at its rear end intermediate the ends of a rearward walking beam which supports rear and intermediate track-mounting wheels at its opposite ends. A lever, pivoted intermediate its ends to the vehicle frame, is connected at its forward end pivotally to the forward portion of the forward walking beam and mounts at its rearward end a rotary driven sprocket arranged to engage an endless track on the wheels. An hydraulic power cylinder on the vehicle frame engages the lever to pivot the latter.

BACKGROUND OF THE INVENTION

This invention relates to track laying vehicles, and more particularly to a novel suspension and drive assembly therefor.

Track laying vehicles provided heretofore are characterized generally by an arrangement of relatively fixed track-mounting wheels. Vehicles of this type have a fixed ground clearance which limits their mobility and stability for side hill travel. Vehicles of this type also have a fixed and limited approach angle to obstacles such as logs, river banks, and other obstructions, thereby limiting the utility of the vehicles. Such vehicles also are incapable of high speed over rough terrain.

SUMMARY OF THE INVENTION

In its basic concept the suspension and drive assembly of this invention utilizes a double walking beam arrangement by which the forward portion of the endless track is adjustable angularly with respect to horizontal, to provide varying degrees of ground clearance and obstruction approach angle.

It is by virtue of the foregoing basic concept that the principal objective of the present invention is achieved, namely to overcome the disadvantages and limitations of prior track laying, vehicles, as discussed hereinbefore.

Another important object of the present invention is the provision of a suspension and drive assembly for track laying vehicles to provide high flotation characteristics, rendering the vehicle well suited for use in swamps and snow.

Still another important object of this invention is the provision of a suspension and drive assembly for track laying vehicles wherein a simplified suspension affords a substantial degree of articulation of the track mounting mechanism to allow high speed travel of the vehicle over rough terrain.

A further important object of the present invention is the provision of a suspension and drive assembly for track laying vehicles, which assembly is of simplified and rugged construction for economical manufacture and long service life.

The foregoing and other objects and advantages of the present invention will appear from the following detailed description, taken in connection with the accompanying drawing of the preferred embodiment.

DESCRIPTION OF THE PREFERRED EMBODIMENT

Figure 1:
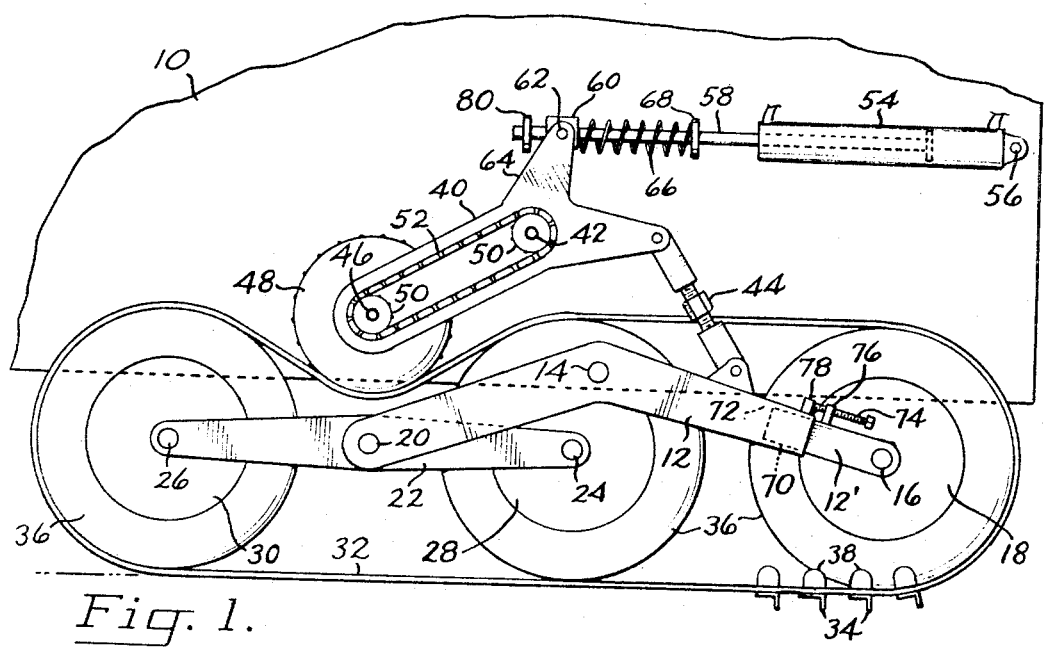
FIG. 1 is a fragmentary view in side elevation of a track laying vehicle showing a suspension and drive assembly embodying the features of the present invention, the components being shown in normal position providing maximum flotation characteristics.

The assembly of the present invention is provided at each side of a vehicle frame 10, one side only being illustrated in the drawing. The assembly includes a forward walking beam 12 pivotally connected intermediate its ends to the vehicle frame, by means of the pivot shaft 14. The front end of the forward walking beam carries a shaft 16 which supports a track-mounting wheel 18. The rear end of the forward walking beam is connected through the pivot shaft 20 to the rearward walking beam 22 intermediate the ends of the latter. Shafts 24 and 26 at the front and rear ends of the rearward walking beam support the intermediate and rear track-mounting wheels 28 and 30, respectively. Trained over the wheels is an endless track member 32 provided with longitudinally spaced, outwardly projecting ground engaging lugs 34.

In the preferred embodiment illustrated, the track-mounting wheels include pneumatic tires 36 which contribute to a softer ride. Accordingly there is provided on the interconnected links of the track member laterally spaced pairs of inwardly projecting guide plates 38 which serve to straddle and confine between them the outer peripheral portions of the pneumatic tires. These guide plates serve to maintain the track member properly aligned on the wheels.

A lever 40 is mounted pivotally intermediate its ends on the vehicle frame by means of the shaft 42. The forward end of the lever is connected pivotally to the forward walking beam 12, forwardly of the pivot shaft 14, by means of the longitudinally adjustable king 44. The rearward end of the lever mounts a rotary shaft 46 to which is secured the driven sprocket 48. The sprocket is arranged in driving engagement with the endless track member 32 between the rear and intermediate wheels. Although a source of rotary power may be connected directly to the sprocket, the preferred ararngement illustrated includes a pair of sprocket 50 secured one to each of the shafts 42 and 46 and interconnected by the drive chain 52. A source of rotary power (not shown), such as an internal combustion engine supported on the vehicle frame, is coupled to the drive shaft 42 which serves also as a pivot shaft for the lever.

Power means is provided for pivoting the lever. In the embodiment illustrated the power means comprises an extensible hydraulic motor in the form of a piston-cylinder unit. One end of the cylinder 54 is mounted pivotally on the vehicle frame, by means of the pivot pin 56. Projecting from the opposite end of the cylinder is an elongated piston rod 58 which reciprocates relative to the cylinder upon the application of hydraulic pressure selectively to opposite ends of the cylinder, as is well known. The piston rod extends slidably through an apertured abutment block 60 which is mounted pivotally, by means of the pin 62, on the tab 64 projecting laterally from the lever intermediate the ends of the latter. A coil spring 66 freely encircles a portion of the piston rod between the abutment block 60 and a collar 68 secured to the piston rod.

Means is provided for tensioning the track member 32 on the mounting wheels. In the embodiment illustrated, the front end portion 12' of the forward walking beam is separate from the main portion and has a rearwardly extending, non-circular shank 70. The shank is receivable telescopically in a corresponding non-circular opening 72 in the adjacent end of the main portion of the beam. An elongated adjusting screw 74 is threaded through a lug 76 on the end portion 12' and is anchored rotatably in a lug 78 on the main portion 12. Thus, rotatable adjustment of the screw extends or retracts the end portion 12' relative to the main portion, to vary the tension of the track member.

The operation of the assembly described hereinbefore is as follows: With the piston rod 58 retracted to the position illustrated in FIG. 1, the spring 66 exerts minimum pressure on the abutment block 60. The lever 40 and forward walking beam 12 thus are disposed such that the ground engaging stretch of the track member 32 between the front and rear wheels 18 and 30 is on a flat plane. Maximum flotation is provided under these conditions.

Let it now be assumed that it is desired to adjust the assembly either for high speed travel over rough terrain, or for maximum obstacle approach angle and maximum ground clearance. Hydraulic fluid under pressure is delivered to the front end of the cylinder 54 to extend the piston rod 58 toward the left. This results in compression of the spring 66 and rotation of the lever 40 resiliently counterclockwise to the position illustrated in FIG. 2. By virtue of the interconnecting link 44, the forward walking beam 12 also is rotated counterclockwise about its pivot shaft 14. This results in elevation of the front wheel 18 and also elevation of the vehicle frame relative to the ground.

If the obstacle is very high, the forward angular portion of the track is brought into abutment with the obstacle and then cylinder 54 is fed with hydraulic fluid to retract the piston rod 58 until the second abutment collar 80 engages the block 60. Further retracting of the piston rod then rotates the lever 40 and forward walking beam 12 clockwise, thus lifting the rear walking beam 22 and the intermediate portion of the track to a position at which the working portion of the track is disposed at a lesser angle, whereby the vehicle is better able to traverse the obstacle.

Rotation of the forward walking beam 12 also results in movement of the rearward walking beam 22 forwardly relative to the vehicle frame. Simultaneously therewith, the counterclockwise rotation of the lever 40 effects movement of the driven sprocket 48 forwardly relative to the frame. In this manner the driven sprocket is maintained in proper track-driving position between the rear and intermediate wheels, automatically tensioning the track member to compensate for its slightly greater length resulting from elevation of the front wheel.

Figure 2:
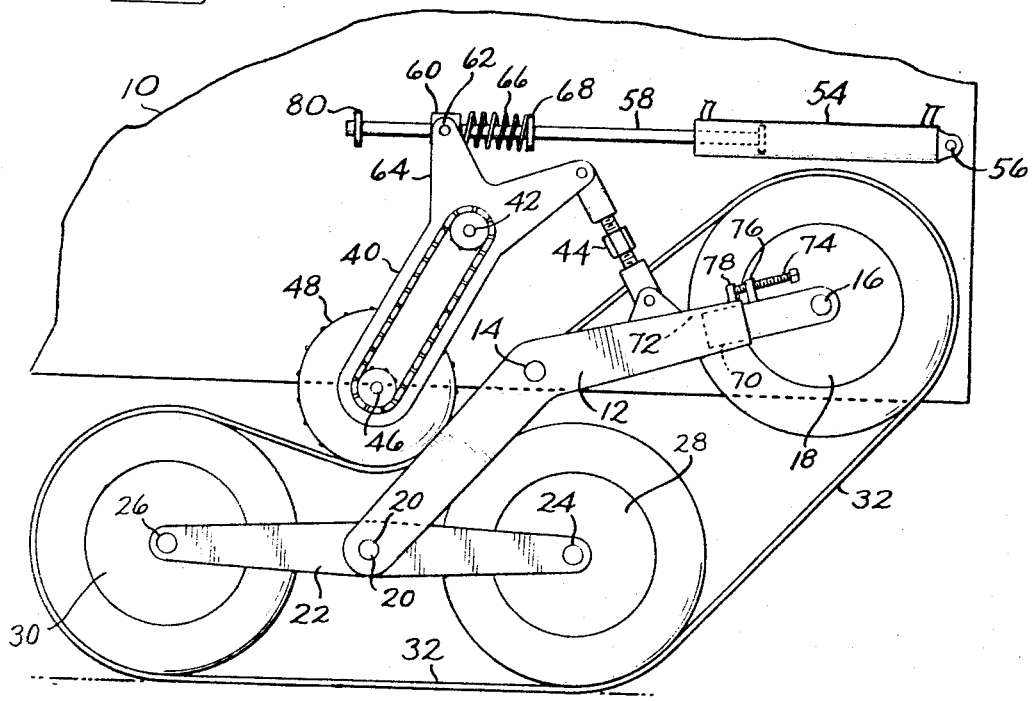
FIG. 2 is a fragmentary view in side elevation, similar to FIG. 1 but showing the components arranged to provide maximum ground clearance, maximum obstacle approach angle and maximum travel speed.

For side hill travel the assembly on the uphill side of the vehicle may be adjusted to the position illustrated in FIG. 1 and the assembly on the downhill side of the vehicle adjusted to the position illustrated in FIG. 2. In this manner minimum ground clearance is provided on the uphill side of the vehicle and maximum ground clearance is provided on the downhill side of the vehicle. The vehicle thus is supported in a more stable position, less inclined than the hill.

From the foregoing it will be appreciated that the suspension and drive assembly of the present invention provides for track laying vehicles many advantages heretofore unavailable. High flotation characteristics, afforded by adjustment of the assembly to the condition illustrated in FIG. 1, renders the vehicle suitable for use in swamps, snow and other unstable ground conditions. By adjustment to the position illustrated in FIG. 2 the vehicle is capable of high speed travel over uneven terrain with maximum smoothness afforded by the resilience of the coil spring and the pneumatic tires. The position of adjustment illustrated in FIG. 2 also provides maximum ground clearance for the vehicle, further enhancing its utility. The elevation of the front wheel provides maximum obstacle approach angle, thus enabling the vehicle to move from a river bed up a sharp embankment, or over large logs or other similar obstructions. By independent adjustment of the assemblies at opposite sides of the vehicle, maximum stability is provided for side hill travel.

It will be understood that the suspension and drive assembly described hereinbefore may be utilized in a single pair as the entire support for a vehicle, or as front and rear pairs either for a single vehicle or for a pair of vehicles connected together in tandem.

It will be apparent to those skilled in the art that various changes may be made in the size, number, type and arrangement of parts described hereinbefore, without departing from the spirit of this invention.

Having now described my invention and the manner in which it may be used, I claim:

1. A suspension and drive assembly for track laying vehicles, comprising
    (a) a forward walking beam pivotally connected intermediate its ends to the vehicle frame,
    (b) a track-mounting wheel on the front end of the forward walking beam,
    (c) a rearward walking beam pivotally connected intermediate its end to the rear end of the forward walking beam,
    (d) rear and intermediate track-mounting wheels on the rear and front ends of the rearward walking beam,
    (e) an endless track passing around the front and rear wheels with the intermediate wheel positioned between and in alignment with the upper and lower runs of the track for guiding said track,
    (f) a lever pivotally connected intermediate its ends to the vehicle frame,
    (g) link means pivotally interconnecting the lever and forward walking beam,
    (h) a driven sprocket on the lever engaging the outer surface of the endless track, and
    (i) power means on the vehicle frame engaging the lever for pivoting the latter and said front walking beam.
2. The assembly of claim 1 wherein
    (a) the link means pivotally interconnects the front end of the lever and the forward walking means forward of its pivot connection to the frame, and
    (b) the driven sprocket is mounted on the rear end of the lever and engages the track between the rear and intermediate wheels.
3. The assembly of claim 1 including
    (a) a drive shaft pivotally connecting the lever to the vehicle frame, and
    (b) drive connecting means interengaging the drive shaft and driven sprocket.
4. The assembly of claim 1 wherein
    (a) the power means comprises an extensible hydraulic motor mounted pivotally at one end on the vehicle frame, and
    (b) resilient means interengages the lever and the opposite end of the motor.

5. The assembly of claim 4 wherein the hydraulic motor comprises
 (a) a piston-cylinder unit having a piston rod projecting from one end of the cylinder,
 (b) the opposite end of the cylinder being mounted pivotally on the vehicle frame,
 (c) the piston rod extending through an abutment member mounted pivotally on the lever, and
 (d) the resilient means comprises a coil spring encircling the piston rod between the abutment member and a collar on the piston rod.

6. The assembly of claim 5 including a second collar on the piston rod on the side of the abutment member opposite the first named collar.

7. The assembly of claim 1 wherein the link means is adjustable longitudinally.

8. The assembly of claim 1 wherein the forward walking beam is adjustable in length.

References Cited

UNITED STATES PATENTS

| 1,705,980 | 3/1929 | Knox | 305—20 X |
| 1,862,934 | 6/1932 | Knox | 305—27 |
| 1,980,276 | 11/1934 | Kegresse | 305—27 X |
| 2,584,512 | 2/1952 | Strait | 305—20 |
| 3,182,741 | 5/1965 | Roach | 305—10 |
| 3,299,978 | 1/1967 | Sponsler | 180—9.52 |

RICHARD J. JOHNSON, *Primary Examiner.*

U.S. Cl. X.R.

180—9.64; 305—20, 22, 23